United States Patent
Yeh et al.

(10) Patent No.: US 10,838,589 B2
(45) Date of Patent: Nov. 17, 2020

(54) GRAPHICAL USER INTERFACE MODIFIED VIA INPUTS FROM AN ELECTRONIC DOCUMENT

(71) Applicant: GOOGLE LLC, Mountain View, CA (US)

(72) Inventors: Shih-Hao Yeh, Santa Clara, CA (US); Navid Samadani-McQuirk, San Bruno, CA (US); Jack Cameron Dille, San Francisco, CA (US); Joshua Curtis Hudgins, Niwot, CO (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 16/132,298

(22) Filed: Sep. 14, 2018

(65) Prior Publication Data

US 2019/0196667 A1     Jun. 27, 2019

Related U.S. Application Data

(60) Provisional application No. 62/610,113, filed on Dec. 22, 2017.

(51) Int. Cl.
*G06F 3/0482* (2013.01)
*G06K 9/00* (2006.01)
(Continued)

(52) U.S. Cl.
CPC ....... *G06F 3/0482* (2013.01); *G06K 9/00469* (2013.01); *G06K 9/00483* (2013.01);
(Continued)

(58) Field of Classification Search
CPC . G06F 3/0482; G06F 9/00469; G06F 9/00483
See application file for complete search history.

(56) References Cited

U.S. PATENT DOCUMENTS 7,792,709 B1    9/2010  Trandal et al.
10,229,314 B1 *  3/2019  Mitchell ............ G06K 9/00442
(Continued)

OTHER PUBLICATIONS

U.S. Appl. No. 16/131,683 to Shih-Hao Yeh et al., filed Sep. 14, 2018.
(Continued)

*Primary Examiner* — Eric J. Bycer
(74) *Attorney, Agent, or Firm* — Dority & Manning, PA

(57) ABSTRACT

A computing device receives a request to render a listing of item entries on a graphical user interface. The computing device receives an electronic image of the document, analyzes the electronic image, and determines a document type by performing an image recognition on a first portion the electronic image, comparing information extrapolated via the image recognition algorithm to a database of document types, and identifying a match between the extrapolated information a document type. The computing device applies an OCR algorithm that corresponds to the determined document type to a second portion of the electronic image, identifies items extracted from the second portion, determines that at least one identified item matches an original item entry, and marks each matching item. The computing device renders an updated listing of item entries on the graphical user interface with a listing of each non-matching item and a marked listing of each matching item.

20 Claims, 14 Drawing Sheets

(51) Int. Cl.
*G06Q 10/08* (2012.01)
*G06Q 30/04* (2012.01)
*G06K 9/20* (2006.01)
*G06Q 40/00* (2012.01)
*G06Q 30/06* (2012.01)
*G06F 3/0484* (2013.01)
*G06Q 10/00* (2012.01)

(52) U.S. Cl.
CPC ....... *G06K 9/2054* (2013.01); *G06Q 10/0875* (2013.01); *G06Q 30/04* (2013.01); *G06Q 30/06* (2013.01); *G06Q 40/12* (2013.12); *G06F 3/04845* (2013.01); *G06K 2209/01* (2013.01); *G06K 2209/15* (2013.01); *G06K 2209/25* (2013.01)

(56) References Cited

U.S. PATENT DOCUMENTS

| | | | |
|---|---|---|---|
| 2010/0030624 A1* | 2/2010 | Vanska | G01C 21/20 705/14.64 |
| 2010/0280918 A1 | 11/2010 | Balent | |
| 2012/0303480 A1* | 11/2012 | Stone | G06Q 30/00 705/26.8 |
| 2013/0066740 A1* | 3/2013 | Ouimet | G06Q 30/06 705/26.7 |
| 2013/0230205 A1 | 9/2013 | Nuggehalli | |
| 2014/0067564 A1 | 3/2014 | Yuan | |
| 2014/0067567 A1 | 3/2014 | Cooke et al. | |
| 2014/0092261 A1* | 4/2014 | Goulart | G06K 9/2081 348/207.1 |
| 2015/0227890 A1 | 8/2015 | Bednarek et al. | |
| 2016/0371650 A1* | 12/2016 | Schmidt | G06Q 30/0635 |
| 2018/0129994 A1* | 5/2018 | Fowler | G06Q 10/1095 |

OTHER PUBLICATIONS

Gutev "Information Extraction from Images of Shopping Receipts", Master Thesis, School of Informatics, University of Edinburgh, 2011, 1-47.

Turkeli "International Search Report and Written Opinion issued in International Application No. PCT/US2018/051113", dated Dec. 17, 2018, 15 pages.

Berthon, "International Search Report and Written Opinion issued in International Application No. PCT/US2018/051123", dated Dec. 17, 2018, 15 pages.

* cited by examiner

GRAPHICAL USER INTERFACE MODIFIED VIA INPUTS FROM AN ELECTRONIC DOCUMENT

CROSS-REFERENCE TO RELATED APPLICATION

This patent application claims priority to U.S. Provisional Application No. 62/610,113 filed Dec. 22, 2017, and entitled "Graphical User Interface Modified via Inputs from an Electronic Document." The entire contents of the above-identified priority application is hereby fully incorporated herein by reference.

TECHNICAL FIELD

The technology disclosed herein relates to creating and modifying graphical user interfaces.

BACKGROUND

Users often create simple lists that comprise a list items. To create or modify such conventional lists, users must manually input each item on the list and then manually remove or otherwise modify each item on the list. For example, to create a list, a user must manually type the name of each item on the list, and the list may include five, fifteen, twenty-five, or even 100 or more items. Then, after obtaining the items on the list, or after obtaining each individual item on the list, the user must manually check-off, strike through, delete, or otherwise remove each obtained item from the list. Such inputs are time-consuming and cumbersome and generally cause users to avoid electronic lists.

SUMMARY

Techniques herein provide computer-implemented methods to render a display list on a graphical user interface. One or more computing devices receive a request to render a listing of item entries on a graphical user interface of a user computing device, the listing of items entries comprising one or more original item entries. The one or more computing devices receive a notification of selection of a user interface element on the user computing device requesting modification of the listing of item entries on the graphical user interface of the user computing device, and activate an image capture device on the user computing device. The one or more computing devices receive an electronic image of the document and analyze the electronic image of the document. The one or more computing devices determine a document type by performing image recognition on a first portion the electronic image, comparing information extrapolated via the image recognition to a database of document types, and identifying a match between the extrapolated information a document type. The one or more computing devices apply an OCR algorithm that corresponds to the determined document type to a second portion of the electronic image, identify items extracted from the second portion of the electronic image via the OCR algorithm, determine that at least one identified item matches at least one of the one or more original item entries, and marking each matching item. The one or more computing devices render an updated listing of item entries on the graphical user interface of the user computing device, the updated listing of items comprising a listing of each non-matching item and a marked listing of each matching item.

In certain other example aspects described herein, systems and computer program products to render a display list on a graphical user interface are provided.

These and other aspects, objects, features, and advantages of the example embodiments will become apparent to those having ordinary skill in the art upon consideration of the following detailed description of illustrated examples embodiments.

DETAILED DESCRIPTION

Overview

Figure 1:
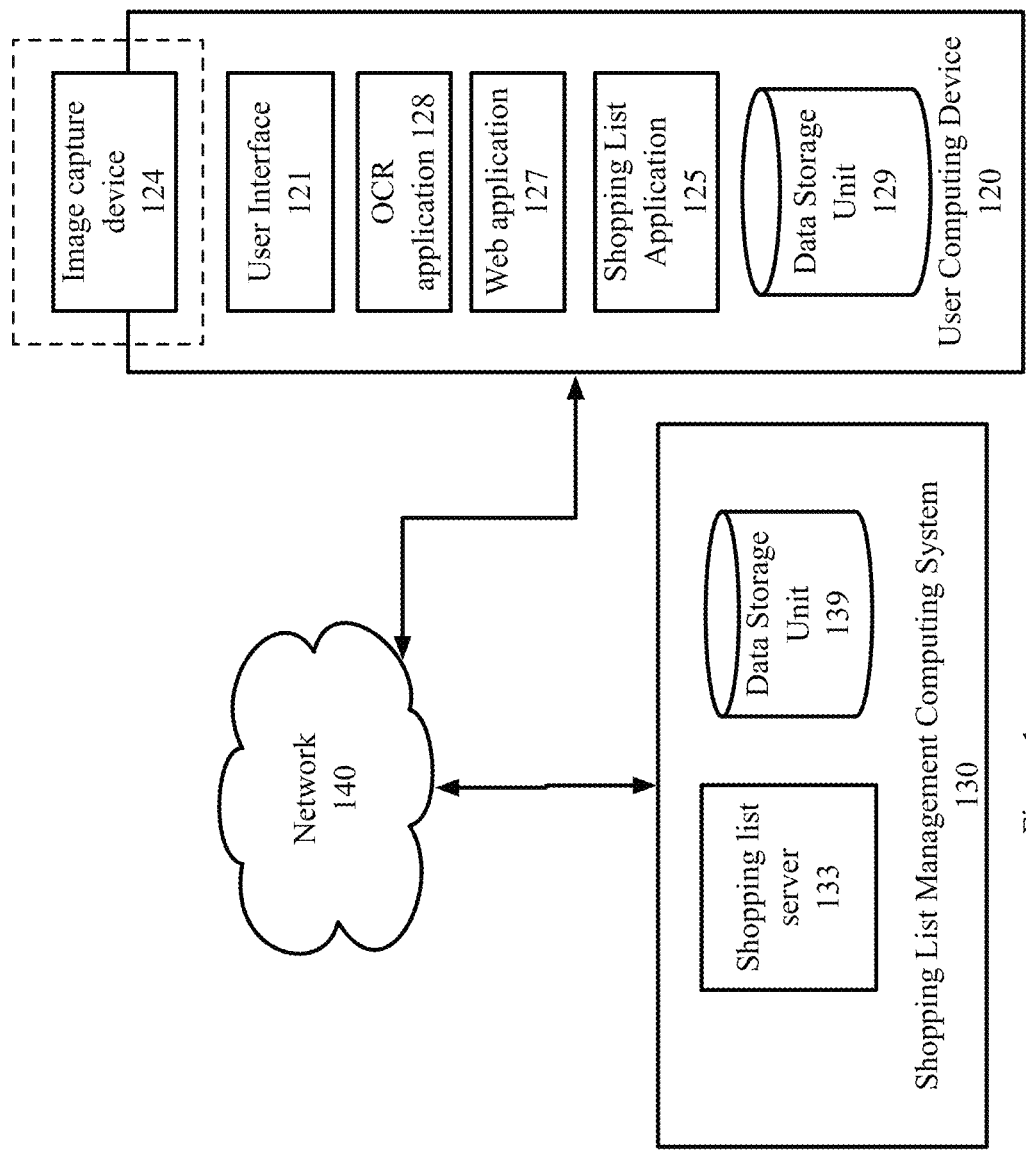
FIG. 1 is a block diagram depicting a system to render graphical user interfaces to create and modify lists of items based on items identified in electronic documents, in accordance with certain examples.

Techniques described herein provide computer-implemented techniques to create and modify lists based on information from electronic documents.

In an example, a user registers with a product management computing system and downloads a shopping list application by accessing a product management computing system website via a user computing device, registering for a user account, entering account information, and downloading the application onto the user computing device. The user requests to generate a new list of items via the application or requests to retrieve a previous list of items. The product management computing system receives the request and retrieves the previous list of items or generates the new list of items in accordance with the request. The product management computing system transmits the previous user generated list of items or a display that allows the user to create a new user generated list of items to the user computing device for display via the user computing device. For example, a new user generated list of items comprises a blank list to which the user may add desired items. The user computing device displays the received user generated list of items, and the user edits the displayed list of items. Editing the user generated list of items may comprise adding one or more items, deleting one or more items, and/or modifying a quantity associated with one or more items on the list of items. The user may select from preexisting item descriptions, enter text or photos of items, and/or speak a voice command to add items to the user generated list of items. In an example, the user selects a user interface element add an item to the list or a user interface element to modify items on the list.

To add items to a list, the user may take a picture, scan, or otherwise capture an electronic image of a paper document, such as a list or receipt. The system analyzes the electronic image to identify items on the document and displays each item on the shopping list. To modify an existing list, the user may take a picture, scan, or otherwise capture an electronic image of a paper document, such as a list or receipt. The system analyzes the electronic image to identify items on the document, determines which items on the document are also on the existing list, flags each co-existing item, and displays an updated list with an indication that the co-existing items have been obtained. The indication may include a check mark by the item, strike-through of the item, moving the item to a separate section of the list for obtained items, combinations of the foregoing, and any other suitable indication of that the item on the existing list is removed from the updated list.

By using and relying on the methods and systems described herein, the system allows users to conveniently and efficiently add items to a list and/or modify items on a list. Accordingly, the systems and methods described herein may be employed to simplify a list creation and modification experience for users adding or removing multiple items from a list, reducing significantly the user inputs required and a time required for data input.

Various examples will be explained in more detail in the following description, read in conjunction with the figures illustrating the program flow.

Turning now to the drawings, in which like numerals represent like (but not necessarily identical) elements throughout the figures, example embodiments are described in detail.

Example System Architectures

FIG. 1 is a block diagram depicting a system to render graphical user interfaces to create and modify lists of items based on items identified in electronic documents, in accordance with certain examples. As depicted in FIG. 1, the example operating environment 100 comprises systems 120 and 130 that are configured to communicate with one another via one or more networks 140 via network computing devices. Two or more of these systems (including systems 120 and 130) may be integrated into the same system. In some examples, a user associated with a device must install an application and/or make a feature selection to obtain the benefits of the techniques described herein.

Each network 140 comprises a wired or wireless telecommunication mechanism by which network systems (including systems 120 and 130) can communicate and exchange data. For example, each network 140 can include, be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth®, Bluetooth® ID Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example, each network system (including systems 120 and 130) comprises a device having a communication module capable of transmitting and receiving data over the network 140. For example, each network system (including systems 120 and 130) may comprise a server, personal computer, mobile device (for example, notebook computer, handheld computer, tablet computer, netbook computer, personal digital assistant (PDA), video game device, GPS locator device, cellular telephone, Smartphone, or other mobile device), a television with one or more processors embedded therein and/or coupled thereto, an appliance with one or more processors embedded therein and/or coupled thereto, or other appropriate technology that comprises or is coupled to a web browser or other application for communicating via the network 140. In the example depicted in FIG. 1, the network systems (including systems 120 and 130) are operated by users and shopping list management computing system operators, respectively.

An example user computing device 120 comprises a user interface 121, a shopping list application 125, and a data storage unit 129. In an example, the user computing device 120 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that comprises or is coupled to a web server (or other suitable application for interacting with web page files) or that comprises or is coupled to the application 125.

A user interface 121 comprises a touch screen, a voice-based interface, or any other interface that allows the user to provide input and receive output from the application 125. In an example, the user interacts with the application 125 via the user interface 121. The user can use the user computing device 120 to generate a new shopping list, access a previous shopping list, or modify a previous shopping list via a user interface 121 and the application 125. The user can edit a shopping list via the shopping list application 125 and can request product recommendations to correspond to each item in the shopping list. The user interface 121 may present a graphical user interface displaying a shopping list and various functions available for the shopping list, and may receive inputs from other peripheral devices (not depicted in FIG. 1).

The shopping list application 125 is a program, function, routine, applet, or similar entity that exists on and performs its operations on the user computing device 120. For example, the application 125 may be one or more of a shopping application, a search application, an Internet browser, a digital wallet application, a loyalty card application, another value-added application, a user interface 121 application, or other suitable application operating on the user computing device 120. In some examples, the user must install an application 125 and/or make a feature selection on the user computing device 120 to obtain the benefits of the techniques described herein.

In an example, the user can use a communication application, such as a web browser application 127 or shopping list application 125, to view, download, upload, or otherwise access documents or web pages via the distributed network 140. In certain examples, one or more functions described herein as performed by the shopping list application 125 may be performed by the web browser application 127. In certain examples, one or more functions described herein as performed by the web browser application 127 may be performed by the shopping list application 125.

The data storage unit 129 enables storage of user account details for retrieval by a user shopping list management computing system 120 account and/or storage of shopping list data. The data storage unit 129 may include any local or remote data storage structure accessible to the user computing device 120 suitable for storing information. The data storage unit 129 may store encrypted information, such as HTML5 local storage.

An image capture device 124 obtains electronic images of paper documents and communicates the electronic images to the shopping list application 125 and/or an optical character recognition (OCR) application 128. The image capture device 124 may be a camera, scanner, or other device suitable to obtain electronic images of paper documents. The image capture device 124 may be an integral component of the user computing device 120 or may be an external device in communication with the user computing device 120.

The optical character recognition (OCR) application 128 receives the electronic images from the image capture device 124 or the shopping list application 125, processes the images to identify products from documents represented in the electronic images, and communicates the identified products to the shopping list application 125.

To create a new list, the shopping list application 125 receives the identified products and renders a graphical user interface 121 comprising a list of the identified products. To modify an existing list, the shopping list application receives the identified products, determines which of the identified products are already listed on the existing list, and modifies the user interface 121 to check-off the identified products on the existing list or to otherwise indicate the identified products have been obtained or are no longer needed on the list.

The user computing device 120 communicates with the shopping list management computing system 130 via the network 140. The shopping list management computing system 130 comprises a shopping list server 133 and a data storage unit 129. User generated shopping lists are saved in the data storage unit 139. Additionally, one or more functions described herein as performed by the shopping list application 125 and/or the OCR application 128 may be performed by the shopping list server 133. The shopping list management computing system 130 also manages user accounts associated with shopping lists.

The data storage unit 139 can include any local or remote data storage structure accessible to the shopping list management computing system 130 suitable for storing information. The data storage unit 139 may store encrypted information, such as HTML5 local storage.

It will be appreciated that the network connections shown are example and other means of establishing a communications link between the computers and devices can be used. Additionally, those having ordinary skill in the art and having the benefit of the present disclosure will appreciate that the computing devices illustrated in FIG. 1 can have any of several other suitable computer system configurations. For example a user computing device 120 embodied as a mobile phone or handheld computer may not include all the components described above.

Figure 14:
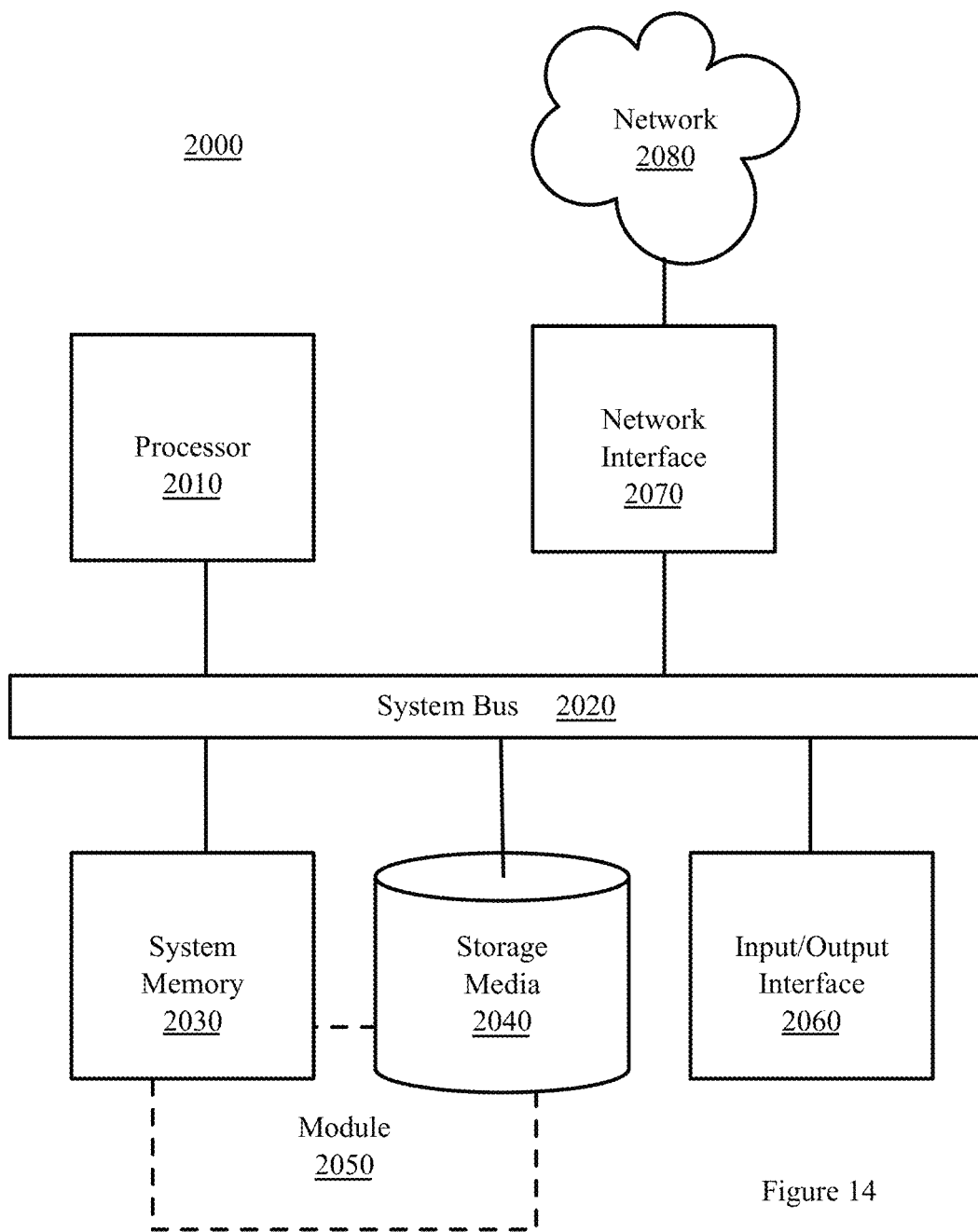
FIG. 14 is a block diagram depicting a computing machine and a module, in accordance with certain examples.

The network computing devices and any other computing machines associated with the technology presented herein may be any type of computing machine such as, but not limited to, those discussed in more detail with respect to FIG. 14. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 14. The computing machines discussed herein may communicate with one another, as well as with other computing machines or communication systems over one or more networks, such as network 140. The network 140 may comprise any type of data or communications network, including any of the network technology discussed with respect to FIG. 14.

Example Processes

The components of the example operating environment 100 are described hereinafter with reference to the example methods illustrated in FIGS. 2-8 and with reference to the illustrations in FIG. 9-13. The example methods of FIGS. 2-8 may also be performed with other systems and in other environments.

The operations described with respect to any of the FIGS. 2-8 can be implemented as executable code stored on a computer or machine readable non-transitory tangible storage medium (e.g., floppy disk, hard disk, ROM, EEPROM, nonvolatile RAM, CD-ROM, flash memory, other memory, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
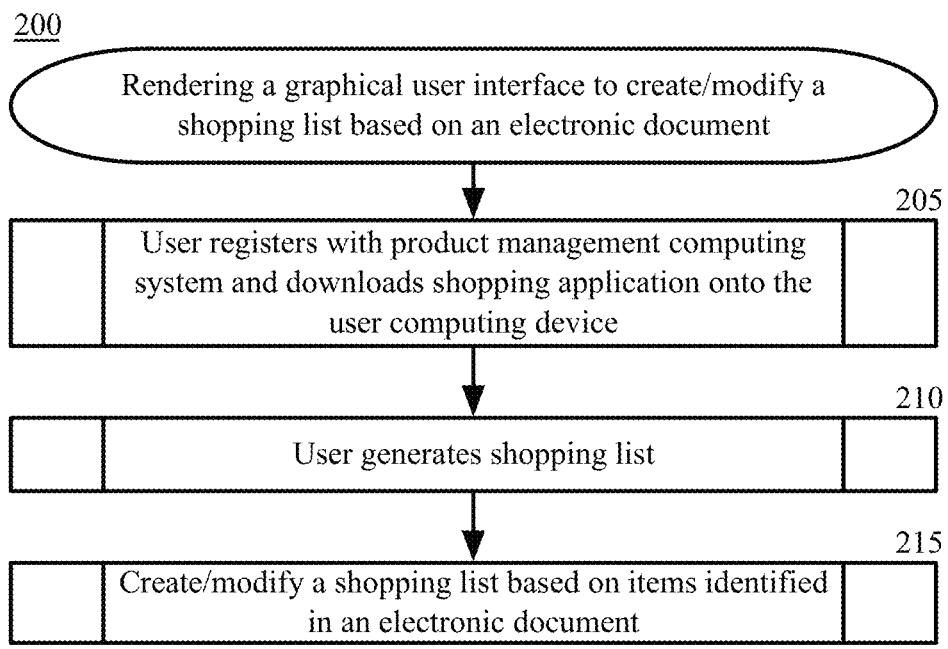
FIG. 2 is a block flow diagram depicting a method to render graphical user interfaces to create and modify lists of items based on items identified in electronic documents, in accordance with certain examples.

FIG. 2 is a block flow diagram depicting a method to render graphical user interfaces to create and modify lists of items based on items identified in electronic documents, in accordance with certain examples. The method 200 is described with reference to the components illustrated in FIG. 1.

In block 205, a user registers with the shopping list management computing system 130 and downloads a shopping list application 125 onto the user computing device 120. The method to register with the shopping list management computing system 130 and to download a shopping list application 125 onto the user computing device 120 is described in more detail hereinafter with reference to the methods described in FIG. 3.

Figure 3:
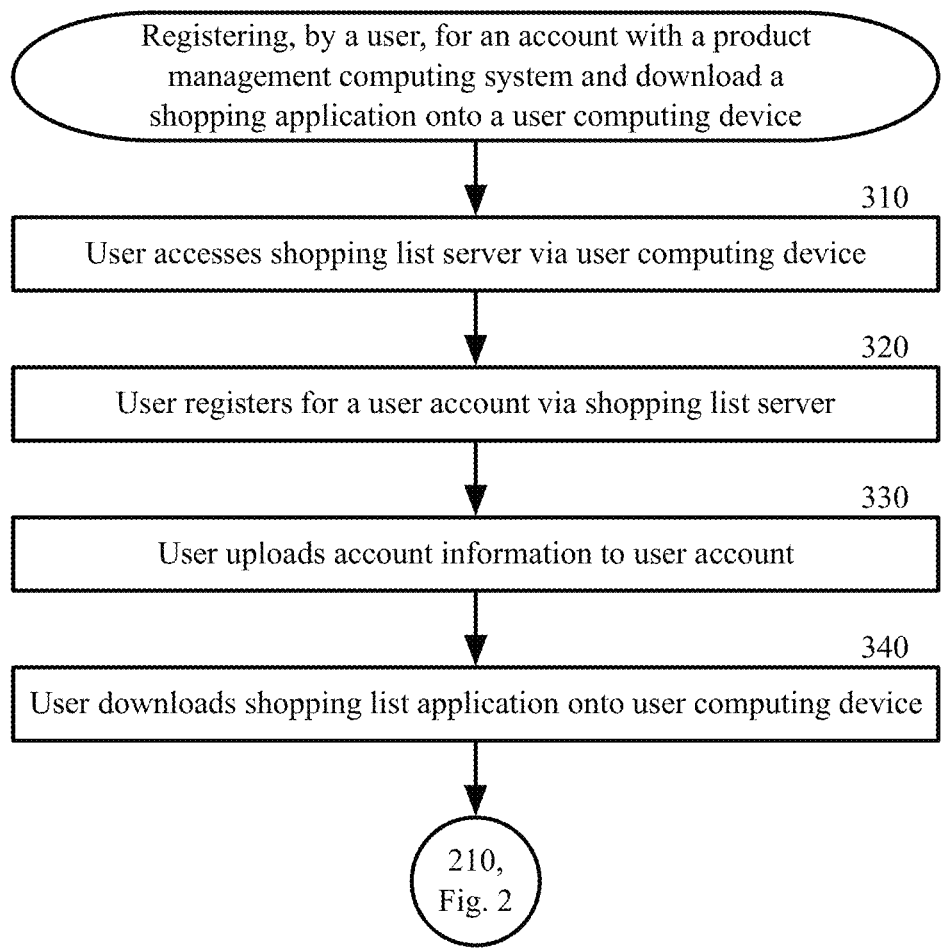
FIG. 3 is a block flow diagram depicting a method to register, by a user, for an account with a management computing system and to download an application onto a user computing device, in accordance with certain examples.

FIG. 3 is a block flow diagram depicting a method 205 to register, by a user, for an account with a shopping list management computing system 130 and to download a shopping list application 125 onto a user computing device 120, in accordance with certain examples, as referenced in block 205 of FIG. 2. The method 205 is described with reference to the components illustrated in FIG. 1.

In block 310, the user accesses the shopping list server 133 (or an operating system application store) via the user computing device 120. The user enters a website address into the web browser application 127 or otherwise accesses the website (or application store) over the network 140 via the user interface 121 of the user computing device 120. The user may also access a platform, digital distribution service, or distribution application over the network 140 via the user computing device 120 to access the shopping list application 125.

In block 320, the user registers for a user account via the shopping list server 133. In another example, the user registers for a user account via the platform, digital distribution service, or distribution application. The user may obtain a user account number, receive the appropriate applications and software to install on the user computing device 120, or perform any action required by the shopping list management computing system 130. The user may utilize the functions of the user computing device 120, such as the user interface 121 and a web browser or other application, to register and configure a user account.

In block 330, the user uploads account information to the user account. Certain account settings may be configurable by the user. In addition to user contact information and configurable authentication settings, the user may add, delete, or edit payment account information via the shopping list server or via the platform, digital distribution service, or distribution application. In an example, the user may select an option to enable or disable the permission of the product management computing system to process transactions. The payment account information may comprise an account number, an expiration date, an address, a user account holder name, or other information associated with the user payment account that would enable the shopping list management computing system 130 to process a payment transaction. The user may define user preferences that the shopping list management computing system 130 can use to produce shopping lists, including product recommendations related to items on the list. Certain user preferences comprise favorite products, favorite brands, favorite merchants, or a combination of a favorite product, a favorite brand, and/or a favorite merchant. For example, user preferences may comprise Merchant A, Brand Z potato chips, and Brand M candles sold at Merchant Z. The shopping list management computing system 130 deduces user preferences based on user selection and viewing histories.

In block 340, the user downloads the shopping list application 125 onto the user computing device 120. The user may select an option on the product management computing system server 133 to download the shopping list application 125 onto the user computing device 120. Depending on the operation of the shopping list application, the user may register for an account and upload account information prior to downloading the shopping list application 125. Alternatively, the user may first download the shopping list application 125 and then register for an account and upload account information via the shopping list application 125.

From block 340, the method 205 proceeds to block 210 in FIG. 2.

Returning to FIG. 2, in block 210, the user generates a shopping list. The method to generate a shopping list is described in more detail hereinafter with reference to the methods described in FIG. 4.

Figure 4:
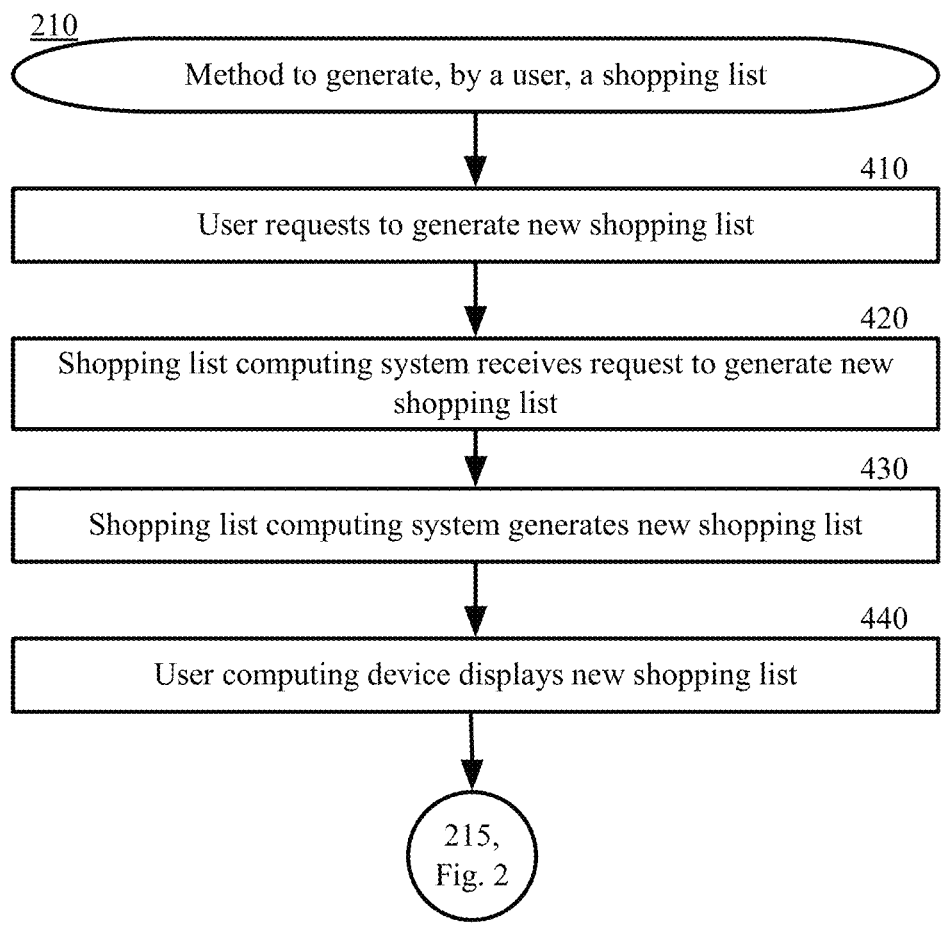
FIG. 4 is a block flow diagram depicting a method to generate, by a user, a list of items, in accordance with certain examples.

FIG. 4 is a block flow diagram depicting a method 210 to generate a shopping list of items, in accordance with certain examples, as referenced in block 210 of FIG. 2. The method 210 is described with reference to the components illustrated in FIG. 1.

In block 410, the user requests to generate a new shopping list. For example, the user signs into the shopping list application 125 on the user computing device 120 and selects a user interface 121 object to request to generate a new shopping list. For example, the user interface 121 object reads "generate new shopping list." In another example, the user requests to access a previous shopping list previously generated by the user. For example, the user signs into the shopping list application 125 on the user computing device 120 and selects a user interface 121 object to request to access a previous user generated shopping list. For example, the user interface 121 object reads "access saved shopping list."

In an example, a shopping list comprises a listing of one or more terms entered by or on behalf of the user. The listing of terms may comprise generalized terms describing one or more items desired by the user. The generalized terms comprise an item description or broad category that corresponds to a shopping list item. For example, the generalized term is "milk" instead of the specific terms "Brand A Organic Skim Milk." For certain items on the list, the listing of terms comprises specific terms entered by or on behalf of the user. In this example, the user enters or the shopping list management computing system 130 determines the specific terms corresponding to the user's desired item.

In block 420, the shopping list management computing system 130 receives the request to generate the new shopping list. For example, in response to receiving an input of a selection of the user interface 121 object, the user computing device 120 transmits a request to generate a new shopping list to the shopping list management computing system 130 via the network 140. In this example, the shopping list management computing system 130 receives the request to generate the new shopping list via the network 140. In another example, the shopping list management computing system 120 receives the request to access the previous shopping list previously generated by the user. For example, in response to receiving an input of a selection of the user interface 121 object, the user computing device 120 transmits a request to access a previous user generated shopping list to the shopping list management computing system 130 via the network 140. In this example, the shopping list management computing system 130 receives the request to access a previous user generated shopping list via the network 140.

In block 430, the shopping list management computing system 130 generates a new shopping list. The new shopping list may comprise a blank shopping list without any listed items. The new shopping list may also comprise a shopping list populated with suggested product listings determined based on a past user purchase history, based on aggregated data from other users having accounts with the shopping list management computing system 130, and/or based on current advertising campaigns of the shopping list management computing system 130 or of one or more merchant computing systems (not illustrated in FIG. 1) associated with product listings in the product listings database. In response to receiving a request for a new shopping list via the network 140, the shopping list management computing system 130 transmits, to the user computing device 120 via the network 140, the new shopping list, and the user computing device 120 receives, via the network 140, the new shopping list from the shopping list management computing system 130.

In response to receiving a request to access a previous user generated shopping list by the shopping list management computing system 130 via the network 140, the shopping list management computing system 130 retrieves a requested previous shopping list previously generated by the user and stored in the data storage unit 139. The shopping list management computing system 130 may transmit, to the user computing device 120 via the network 140, the retrieved previous shopping list, and the user computing device 120 receives, via the network 140, the retrieved previous shopping list from the shopping list management computing system 130.

In block 440, the user computing device 120 displays the new shopping list via the user interface 121 of the user computing device 120.

From block 440, the method 210 proceeds to block 215 in FIG. 2. While certain functions identified in FIG. 4 are described as being performed by the shopping list management computing system 130, the functions may be performed locally by the user computing device 120. For example, the shopping list application 125 may receive the request to generate a new or previous shopping list, generate the blank shopping list (or retrieve the previous shopping list from the data storage unit 129), and render the shopping list via the user interface 121 of the user computing device 120.

Figure 9:
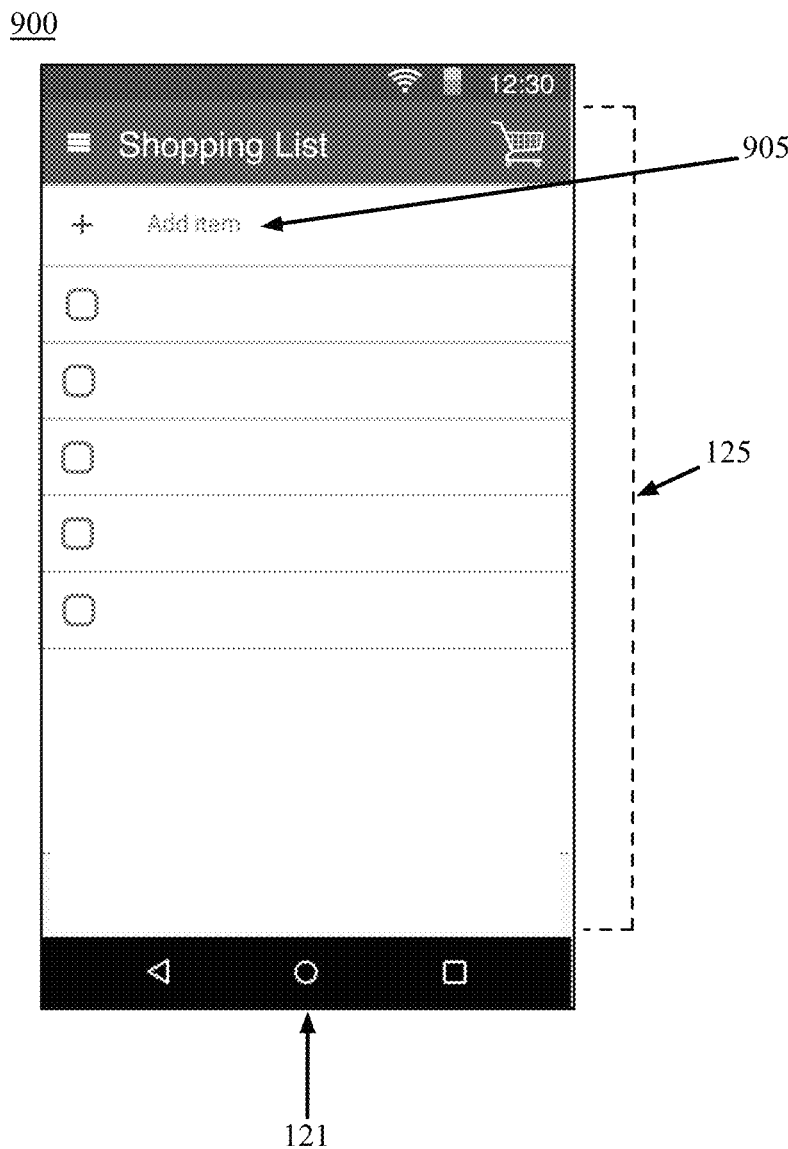
FIG. 9 is an illustration of a graphical user interface comprising an empty list, in accordance with certain examples.

FIG. 9 is an illustration of a graphical user interface comprising an new, empty list, in accordance with certain examples. FIG. 9 depicts the new shopping list 900 displayed in the shopping list application 125 on the user interface 121 of the user computing device 120. The new shopping list 900 is displayed with empty lines. A user interface object 905 that reads "+ Add item" may be selected by the user via the user interface 121 to add a new item to the displayed shopping list.

Returning to FIG. 2, in block 215, the shopping list application 125 creates or modifies a shopping list 900 based on items identified in an electronic document. Block 215 will be described in further detail hereinafter with reference to FIG. 5.

Figure 5:
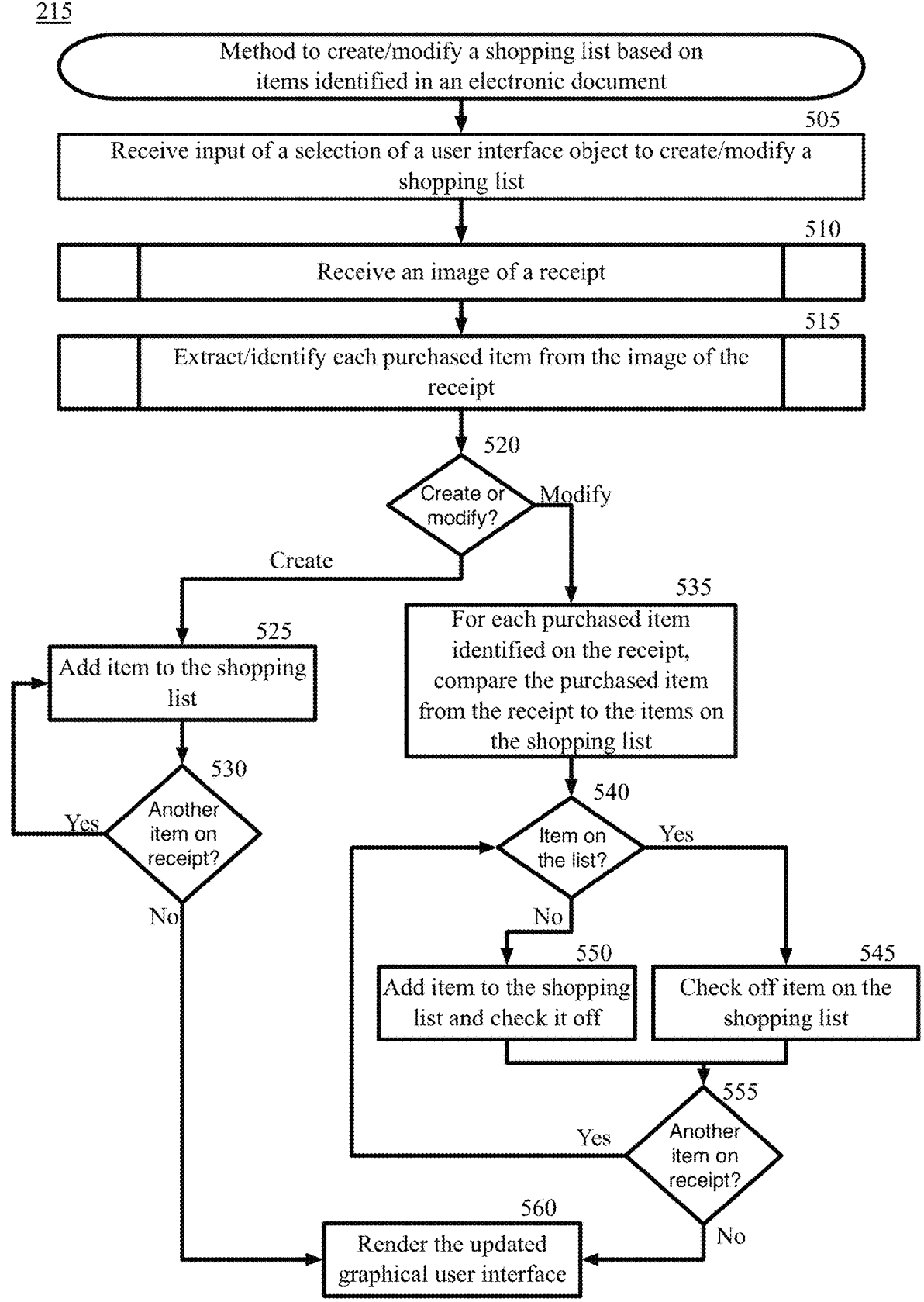
FIG. 5 is a block flow diagram depicting a method to create and modify lists of items based on items identified in electronic documents, in accordance with certain examples.

FIG. 5 is a block flow diagram depicting methods 215 to create and modify lists of items based on items identified in electronic documents, in accordance with certain examples. Methods 215 will be described with reference to the components in FIG. 1.

In block 505, the user selects a user interface 121 element to create or modify a shopping, and the shopping list application 125 receives the input corresponding to the user selection. For example, the user may select the "+ Add Item" interface object 905 illustrated in FIG. 9 create a list by adding items to a list. Alternatively, the user may select an "Update List" interface object 1140 described hereinafter with reference to FIG. 11 to modify an existing list. Selection of a user interface object generates an input to the shopping list application to create or modify a shopping list.

In response to receiving input to create or modify a shopping list, the shopping list application 125 prepares to receive an image of receipt in block 510. The shopping list application may activate the image capture device 124 for the user to input an image of receipt or open a file directory to allow the user to select an existing image or message, such as a word picture, word processing document, email message, or other suitable electronic document comprising a listing of items. Block 510 will be described in further detail hereinafter with reference to FIG. 6.

Figure 6:
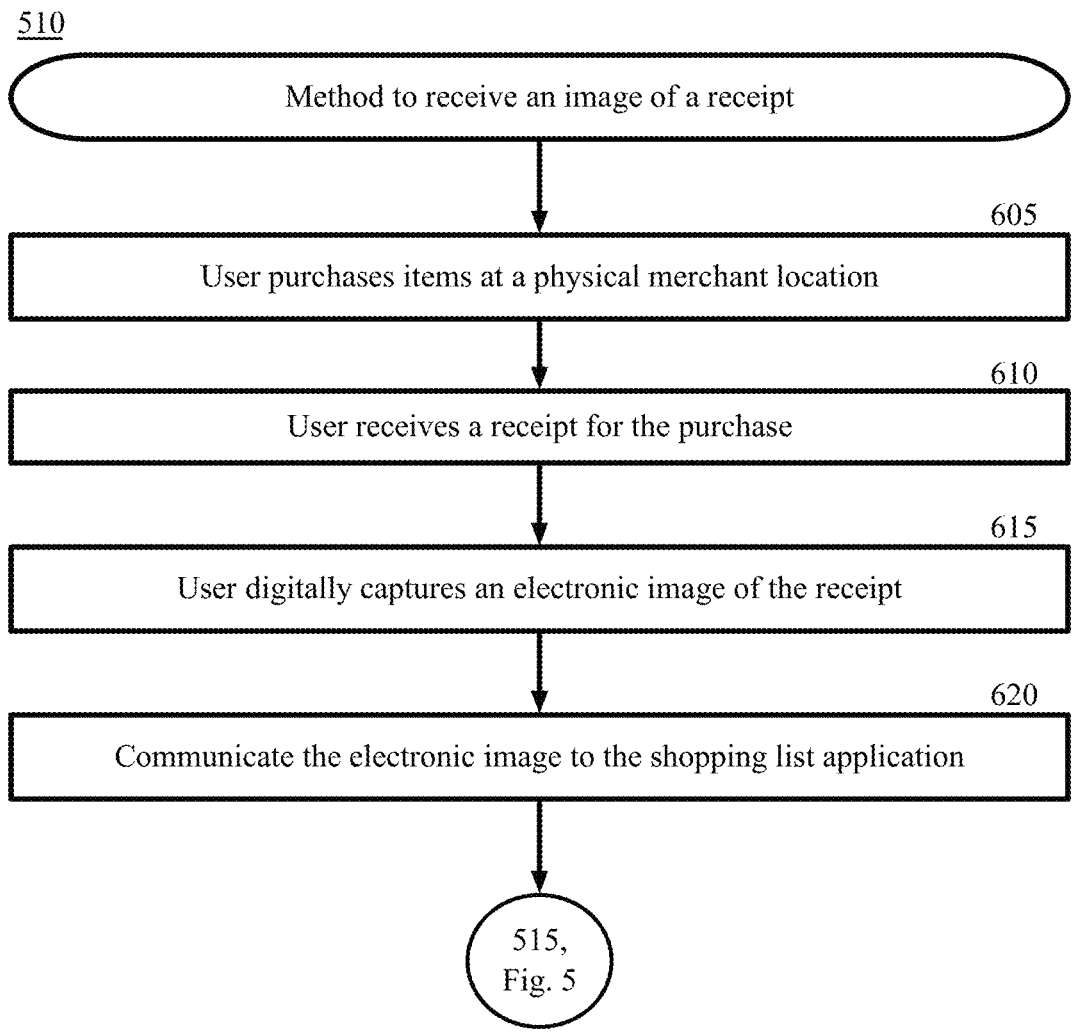
FIG. 6 is a block flow diagram depicting a method to receive an electronic image, in accordance with certain examples.

FIG. 6 is a block flow diagram depicting a method 510 to receive an electronic image, in accordance with certain examples. In block 605, the user purchases one or more items at a physical merchant location. As result, in block 610, the user receives a paper receipt for the purchase.

In block 615, the user digitally captures an electronic image of the receipt. The user may use the image capture device 124 to capture the electronic image of the receipt. If the image capture device 124 is a camera, the user may take a picture of the paper receipt to capture the electronic image of the receipt. If the image capture device 124 is a scanner, the user may insert the paper receipt into the scanner to capture the electronic imaging receipt. In block 615 the user digitally captures an image of a physical receipt, such as a receipt printed on paper (or a hand-written document). The user may execute the shopping list application 125 at the user device 120 and select an icon to capture an image. In response, the shopping list application 125 activates the image capture device 124, such as a camera. The user can operates the camera to take a picture of an object or a document, such as a paper receipt documenting a purchase transaction or an electronic receipt displayed on a screen. The user may also scan a paper document, such as a paper receipt, using an external image capture device 124. The user computing device 120 stores an image file for the electronic image in the data storage unit 129 or another storage location. The user can navigate to a stored image file via the user interface 121 associated with the shopping list application 125.

The shopping list application 125 also may obtain the electronic images of receipts from electronic messages maintained by the shopping list management computing system 130. For example, the shopping list application 125 may parse electronic documents stored in the data storage unit 129 or managed by other applications on the user computing device 120 to identify receipts. When the user purchases items online or in a store, the merchant may email a receipt for other confirmation of the purchase to the user. The shopping list application 125 may recognize these electronic documents as receipts based on email addresses of the sending organization, content of the message comprising a known merchant name, and/or content of the message comprising known items available for purchase. Additionally, many electronic documents corresponding to purchases include identifying terms such as receipt, confirmation, purchase, order, or other similar terms, which identify the electronic documents as corresponding to a purchase receipt.

Although the electronic document described herein is mainly an image of a receipt, other electronic documents may provide a list of items to add to the shopping list. For example, the user may handwrite a list of items for a shopping list and capture an image of the hand-written list using the image capture device 124.

Figure 10A:
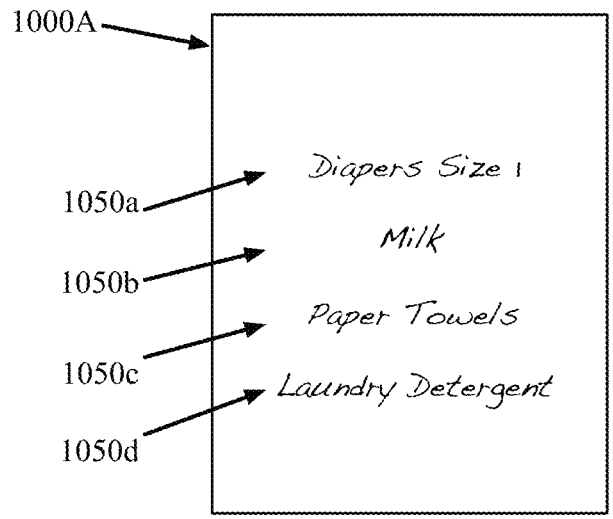
FIG. 10A is an illustration of a hand-written list on paper, in accordance with certain examples.
Figure 10B:
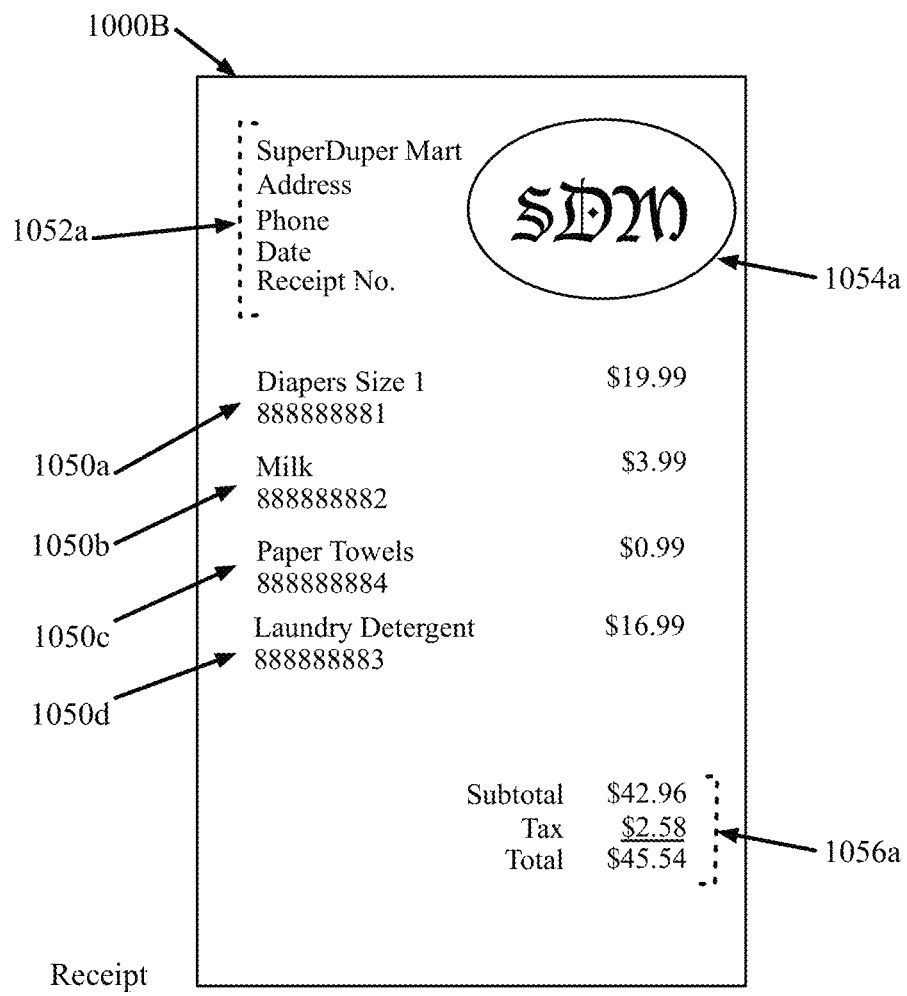
FIG. 10B is an illustration of a paper receipt comprising a list of items, in accordance with certain examples.

FIGS. 10A and 10B illustrate certain paper documents that serve as the source of the electronic image including items to add to a shopping list. FIG. 10A is an illustration of a hand-written list 1000A on paper, in accordance with certain examples. FIG. 10B is an illustration of a paper receipt 1000B comprising a list of items, in accordance with certain examples.

As shown in FIG. 10A, the paper list 1000A comprises a list of four items 1050a-1050d to add to the shopping list.

Items 1050*a*, 1050*b*, 1050*c*, and 1050*d* read "Diapers Size 1," "Milk," "Paper Towels," and "Laundry Detergent," respectively.

As shown in FIG. 10B, the paper receipt 1000B also comprises a list of the four items 1050*a*-1050*d* to add to the shopping list. Items 1050*a*, 1050*b*, 1050*c*, and 1050*d* read "Diapers Size 1," "Milk," "Paper Towels," and "Laundry Detergent," respectively. The paper receipt 1000B includes other information typically found on a receipt, such as merchant information 1052*a* (merchant name, merchant address: phone call merchant day, and receipt/order number), a merchant logo 1054*a*, corresponding prices associated with each of the items 1050*a*-1050*d*, and total price information 1056*a* (subtotal, tax, and total).

In block 620, the image capture device 124 communicates the electronic image to the shopping list application 125.

From block 620, the method 510 proceeds to block 515 in FIG. 5. Referring back to FIG. 5, in block 515, the OCR application 128 extracts and identifies each purchased item from the received image of the receipt. Block 515 will be described in further detail hereinafter with reference to FIG. 7.

Figure 7:
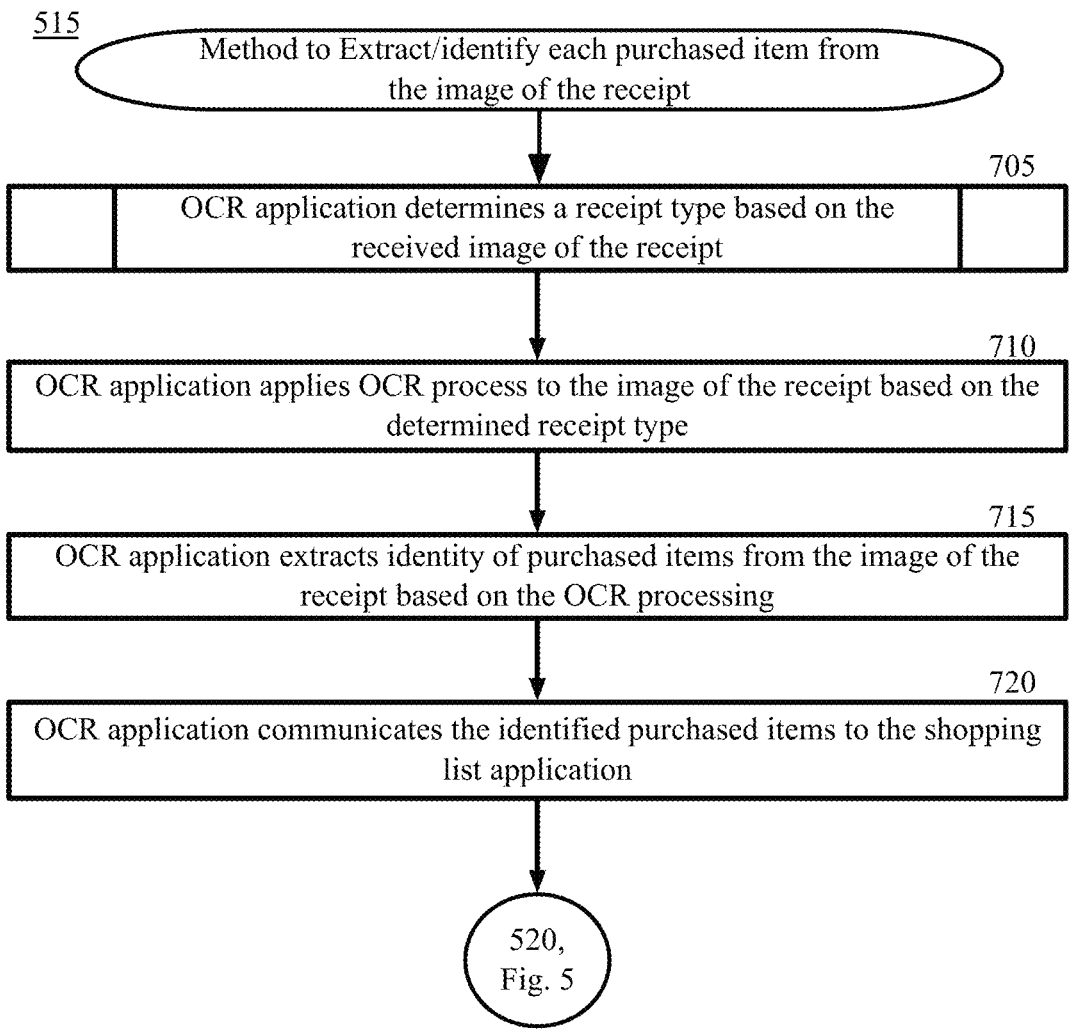
FIG. 7 is a block flow diagram depicting a method to extract items from electronic documents, in accordance with certain examples.

FIG. 7 is a block flow diagram depicting a method 515 to extract items from electronic documents, in accordance with certain examples. The method 515 will be described with reference to the components in FIG. 1.

In block 705, the OCR application 128 determines a receipt type based on the received image of the receipt. Identifying the type of receipt allows the OCR application 128 to apply a specific OCR algorithm to specific areas of the receipt to identify items from the receipt and to avoid analyzing other information on the receipt that may not relate to the items in the purchase transaction. Block 705 will be described in further detail hereinafter with reference to FIG. 8.

Figure 8:
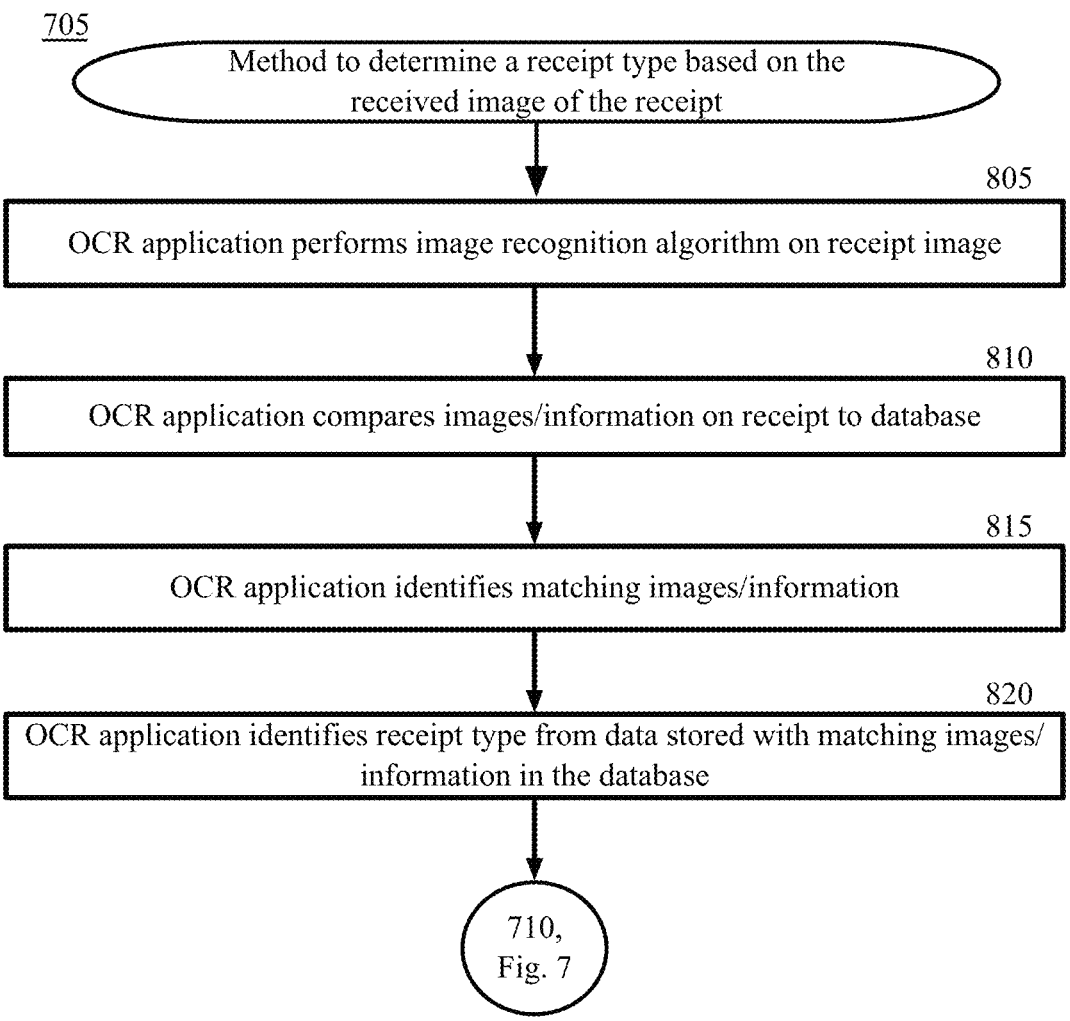
FIG. 8 is a block flow diagram depicting a method 705 to determine a receipt type based on an electronic image of a receipt, in accordance with certain examples.

FIG. 8 is a block flow diagram depicting a method 705 to determine a receipt type based on an electronic image of a receipt, in accordance with certain examples. The method 705 will be described with reference to the components depicted in FIG. 1.

In block 805, the OCR application 128 performs an image recognition algorithm on the receipt image. The image recognition may be performed by the OCR application 128 on the user computing device 120. The OCR application 128 or the shopping list application 125 may transmit the image to the shopping list management computing system 130 or another suitable computing device for the image recognition.

The OCR application 128 may use any suitable algorithm, process, method, or other manner of recognizing receipt images. For example, the OCR application 128 may isolate images, such as logo, within the image of the receipt. The OCR application 128 may apply an OCR algorithm to one or more words identified in the logo. That is, if the image recognition algorithm recognizes that a word is represented in the logo, then an OCR algorithm may be used to identify the word. For example, a logo of the receipt issuer may contain a name or other word. The employed OCR algorithm may be a function of the image recognition algorithm, a separate OCR algorithm, or other suitable OCR technique.

With reference to FIG. 10B, a receipt 1000B may include certain information. The information may include merchant information 1052*a*, merchant logo 1054*a*, product listings located in relation to the merchant information 1052*a* and the merchant logo 1054*a*, and product totals 1056*a* located in relation to other items on the receipt.

The OCR application 128 processes the image of the receipt and identifies logos, the merchant information, and other information on the receipt.

In block 810, the OCR application 128 compares the logo images and/or merchant information to a stored database of images/merchant information to identify matching images. The OCR application 128 identifies images, logos, words, icons, pictures, badges, and other features of the logo on the receipt image. The logo is compared to a database storing images associated with receipt issuers. The stored logo may be supplied by receipt issuers or obtained from any suitable source. For example, the stored logo may be obtained from websites associated with the receipt issuers or another suitable website. The stored logo may be supplied by a third party logo provider. Any suitable source for the logo may be used. The stored logo may be maintained in a database stored on data storage unit 129, the shopping list management computing system data storage unit 139, or another suitable computing device or data storage unit.

Similarly, the OCR application 128 compares the merchant information to a stored database of merchant data to identify matching merchants.

In block 815, the OCR application 128 identifies matches between the logo/merchant data and the stored images and merchant information in the database. For example, a particular picture in the logo may be a match to a logo in the stored images to a level of confidence over a configured confidence threshold, and/or a configurable portion of the merchant information may match merchant information stored in the database.

In block 820, the OCR application 128 extracts the identity of the logo image or merchant information from the information associated with a matching image/merchant information in the database. For example, when the OCR application 128 compares the identified logo to the database of images and locates a matching image, the OCR application 128 accesses any data stored with the matching image. Similarly, when the OCR application 128 compares the identified merchant information to the database of merchant information and locates matching merchant information, the OCR application 128 accesses any data stored with the matching merchant information. The stored data may be information about the receipt issuer, information about the issued receipt, a category of the receipt, or any suitable information.

The data stored with the matching images/information may include an identification of the receipt type. For example, the OCR application 128 may identify a logo on the receipt image that matches a logo in the database. The logo may be identified in the database as the logo for a particular merchant. In this example, the receipt image may be identified as likely being a receipt associated with the particular merchant.

In another example, the OCR application 128 may identify an image that matches an image in the database of a character associated with a particular department store, such as a cartoon mascot. In this example, the receipt image may be identified as likely being a gift receipt issued by the particular department store.

The OCR application also may determine that the receipt type is a hand-written document, such as a hand-written receipt or hand-written list, based on the writing characteristics. Writing characteristics may include the inconsistencies in ink distribution and character formation, indicating a hand-written document.

From block 820, the method 705 returns to block 710 in FIG. 7.

In block 710, the OCR application 128 applies an OCR algorithm to the receipt image to identify the information on the receipt based on the determined receipt type. The OCR application may apply a particular OCR algorithm or analyze particular portions of the receipt based on characteristics of the receipt associated with the known receipt type. If a particular receipt type is not identified, the OCR algorithm applies a standard process to the receipt.

The OCR algorithm may represent any suitable process, program, method, or other manner of recognizing the digits or characters represented on the receipt image. The accuracy and speed of the OCR algorithm may be improved by using the information obtained in the image recognition process. For example, the OCR application may have determined that a logo or merchant information on the receipt image matches a logo or merchant information associated with a particular merchant. An OCR algorithm may be used that is customized for receipts from the particular merchant. The OCR algorithm may be customized to look for characters in particular locations on the receipt image to identify the listed products. The OCR algorithm may be customized to look for a certain number of characters. The OCR algorithm may be customized to look for certain combinations of characters, such an SKU. The OCR algorithm may be customized to know that the receipts from the particular merchant typically have certain data on the reverse side of the receipt. The OCR algorithm may be customized to look for any configured arrangements, data locations, limitations, receipt types, character configurations, or other suitable data associated with the particular receipt type.

In block 715, the OCR application 128 extracts the receipt information, such as the products listed on the image of the receipt. Other information, such as the merchant information, may also be extracted from the image.

The OCR application 128 extracts the relevant information from the receipt image. The OCR application 128 displays the extracted data on the user interface 121 to allow the user 101 to verify or edit the data.

In block 720, the OCR application 128 communicates the identified items from the receipt to the shopping list application 125.

From block 720, the method 515 proceeds to block 520 in FIG. 5.

Returning to FIG. 5, the method 215 proceeds to block 520. In block 520, the method 215 determines whether the user input an action to create or modify a list. For example, if the user selected the add item user interface object, the method 215 determines that the user wants to create a list by adding items to a list. In this case, the method 215 branches to block 525.

In block 525, the shopping list application 125 adds an item to the shopping list. Referring to FIGS. 10A and 10B, the receipts 1000A and 1000B each included a list of four items 1050a-1050d to add to the shopping list. Items 1050a, 1050b, 1050c, and 1050d read "Diapers Size 1," "Milk," "Paper Towels," and "Laundry Detergent," respectively. Accordingly, if processing either receipt 1000A or 1000B, the shopping list application 125 parses the information received in block 510 to identify the first item 1050a on the receipt, add that item to the list, and then determines in block 530 whether more items exist to be added to the list. If so, the method 215 repeats block 525 and block 530 until all items are added to the list. In this manner, the shopping list application 125 will add all four items 1050a-1050d to the list.

The method 215 then proceeds to block 560 in which the shopping list application 125 renders the shopping list on the user interface 121 of the user computing device 120.

Figure 11:
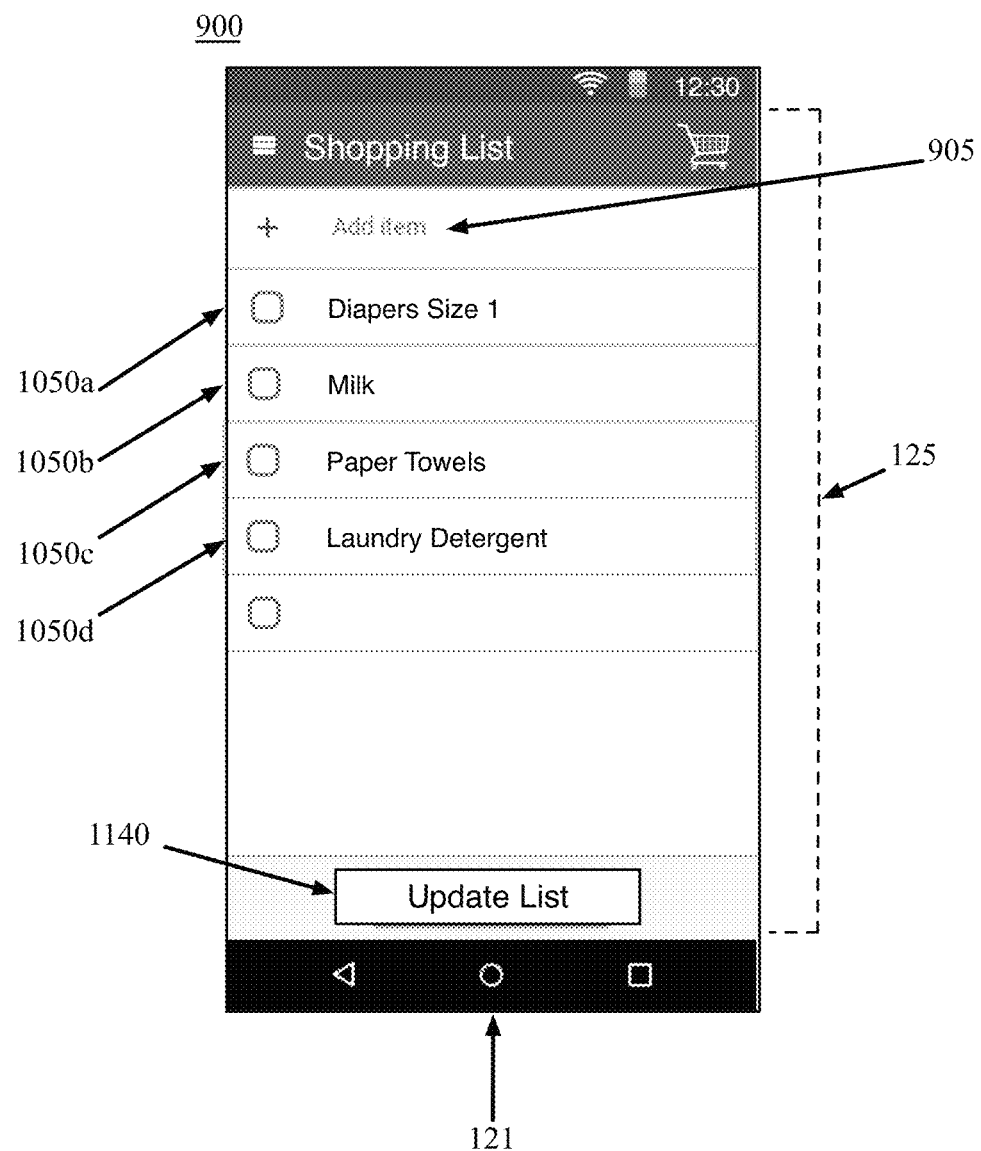
FIG. 11 is an illustration of a graphical user interface comprising a list of items created based on items identified in an electronic document, in accordance with certain examples.

FIG. 11 is an illustration of a graphical user interface comprising a list 1100 of items created based on items identified in an electronic document, in accordance with certain examples. As depicted in FIG. 11, the list 1100 displays all four items 1050a-1050d. FIG. 11 depicts the new shopping list 1100 displayed in the shopping list application 125 on the user interface 121 of the user computing device 120. The new shopping list 1100 is displayed with the four items 1050a-1050d and additional empty lines. The user interface object 905 that reads "+ Add item" may be selected by the user via the user interface 121 to add more new items to the displayed shopping list. Additionally, a user interface object 1140 that reads "Update List" is presented and may be selected by the user via the user interface 121 to update the items in the displayed shopping list.

Referring back to block 520, if the shopping list application 125 determines that the user desires to modify an existing list, the method 215 branches to block 535. For example, if the shopping list application 125 receives an input indicating a selection of the update list user interface object 1140, the shopping list application 125 determines to update an existing list. In this case, the method 215 branches to block 535.

In block 535, for each purchased item identified on the receipt, the shopping list application 125 compares the purchased item from the receipt to the items on the shopping list to determine, in block 540, whether any purchased items on the receipt are already on the shopping list.

Figure 12:
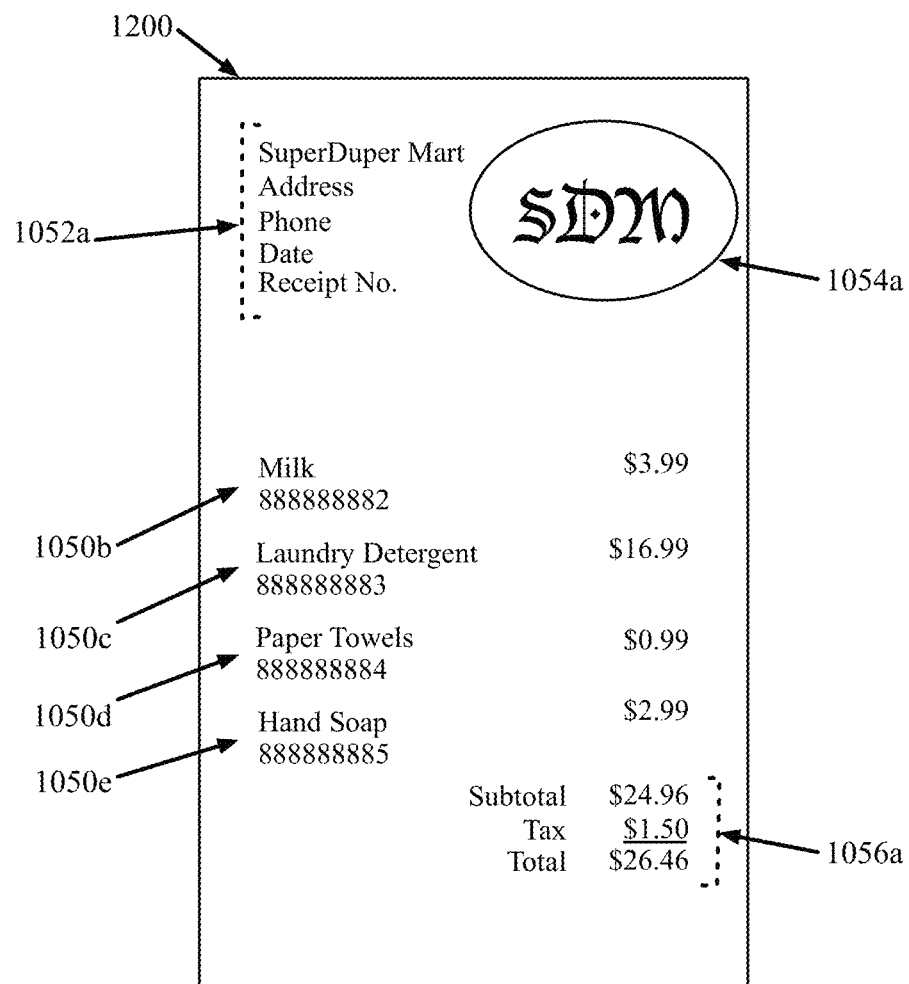
FIG. 12 is an illustration of another electronic document comprising a list of items in a receipt, in accordance with certain examples.

FIG. 12 is an illustration of another electronic document 1200 comprising a list of items in a receipt, in accordance with certain examples. As an example, consider that the receipt 1200 is a receipt for items purchased after creation of the list 1100 and has been processed through blocks 510 and 515 to identify items on the receipt 1200. The receipt 1200 includes a listing of four items 1050b-1050e. Items 1050b, 1050c, 1050d, and 1050e read "Milk," "Paper Towels," "Laundry Detergent," and "Hand Soap," respectively. Accordingly, when comparing the items listed in the receipt 1200 with the items on the list 1100 from FIG. 11, the shopping list application 125 determines that items 1050b-1050d for milk, paper towels, and laundry detergent from the receipt 1200 already exist on the shopping list 1100. In this case, the method 215 branches to block 545, in which the shopping list application checks off the items 1050b-1050d for milk, paper towels, and laundry detergent on the shopping list.

The receipt 1200 also includes item 1050e for hand soap, which was not on the previous shopping list 1100. Accordingly, with reference back to blocks 535 and 540, when comparing the items listed in the receipt 1200 with the items on the list 1100 from FIG. 11, the shopping list application 125 determines that item 1050e for hand soap from the receipt 1200 did not already exist on the shopping list 1100. In this case, the method 215 branches to block 550, in which the shopping list application adds item 1050e for hand soap to the list and also checks off item 1050e for hand soap.

Via block 555, the shopping list application 125 repeat blocks 535, 540 and 545, 550 until it has processed each item from the receipt 1200. The method 215 then proceeds to block 560 in which the shopping list application 125 renders the updated shopping list on the user interface 121 of the user computing device 120.

Figure 13:
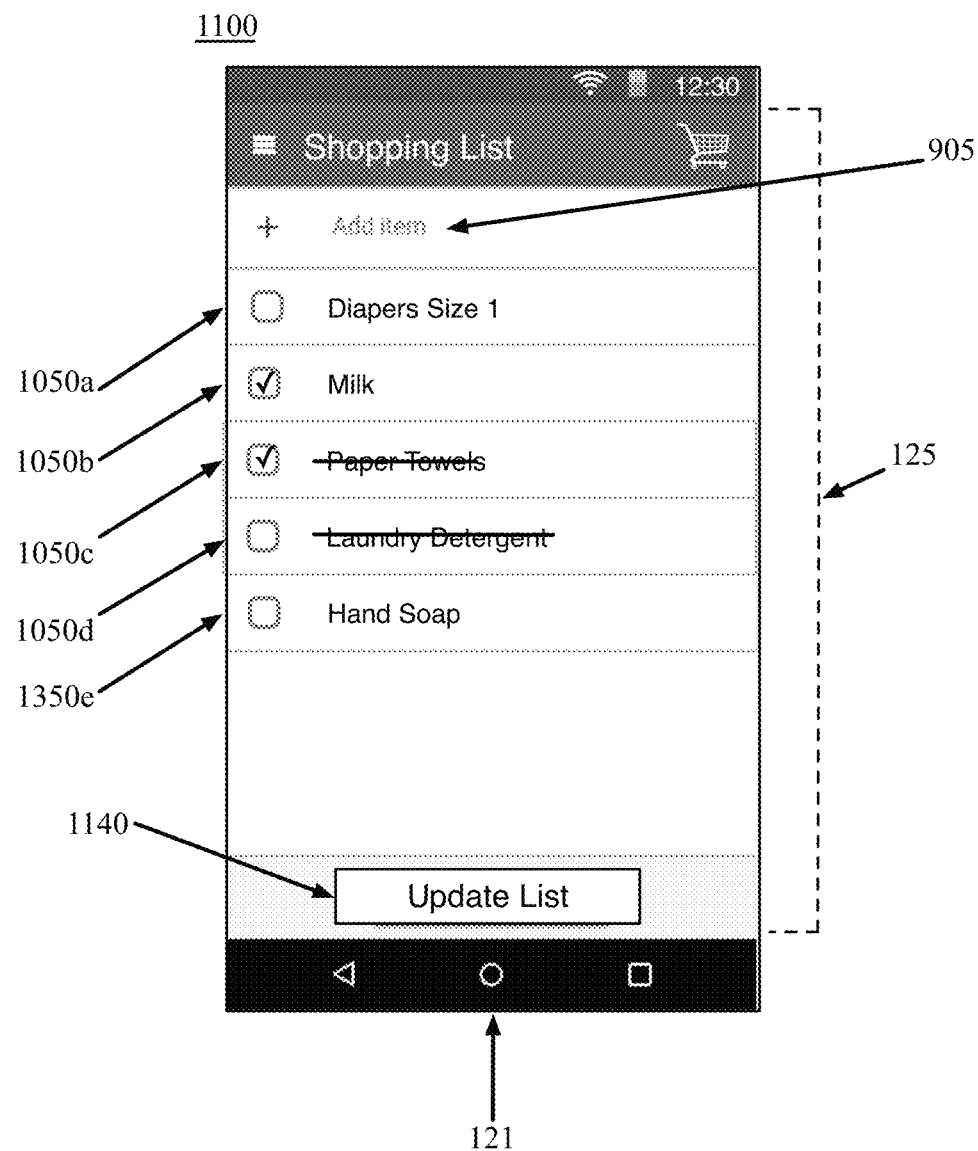
FIG. 13 is an illustration of a graphical user interface comprising a list of items modified based on items identified in an electronic document, in accordance with certain examples.

FIG. 13 is an illustration of a graphical user interface comprising a list 1300 of items modified based on items identified in an electronic document, in accordance with certain examples. FIG. 13 depicts the updated shopping list 1300 displayed in the shopping list application 125 on the user interface 121 of the user computing device 120. As depicted in FIG. 13, the list 1300 displays all four items 1050a-1050d previously listed on the list 1100 in FIG. 11. However, because items 1050b-1050d were determined to exist on the subsequent receipt 1200, the list 1300 depicts items 1050b-1050d as "checked-off" to indicate that those items are not needed. The check-off depiction can be any suitable indication that the items on the list have been obtained or are otherwise not on the list. As depicted in FIG. 13, the check-off is indicated with a check mark, strikethrough of the item, or a combination. The check-off also could be indicated by moving those items to another section of the list denoted to indicate those items have been removed from the list. Additionally, these items could be deleted entirely from the list.

The list 1300 also displays the new item 1350e for hand soap, which was identified on the subsequent receipt 1200 but not on the previous list 110. The item 1350e is added and then indicated as checked off. In this manner the shopping list application 125 may aggregate a more accurate purchase history for the user account associate with the shopping list. In the user interface displaying the list 1300, the user interface object 905 that reads "+Add item" may be selected by the user via the user interface 121 to add more new items to the displayed shopping list. Additionally, the user interface object 1140 that reads "Update List" is presented and may be selected by the user via the user interface 121 to further update the items in the displayed shopping list.

While certain functions identified in FIGS. 2-13 are described as being performed locally by the user computing device 120 or an application functioning on the user computing device, the functions may be performed by the shopping list management computing system 130.

Other Example Embodiments

FIG. 14 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray® ID disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to render a display list on a graphical user interface, comprising:
   receiving, by one or more computing devices, a request to render a listing of items on a graphical user interface of a user computing device, the listing of items comprising one or more original items;
   receiving, by the one or more computing devices, a notification of selection of a user interface element on the user computing device requesting modification of the listing of items;
   receiving, by the one or more computing devices, an electronic image of a document associated with a transaction;
   analyzing, by the one or more computing devices after completing the transaction, the electronic image of the document by:
      determining a document type by performing image recognition on a first portion the electronic image, comparing information extrapolated via the image recognition to a database of document types, and identifying a match between the extrapolated information and the document type;
      applying an optical character recognition algorithm that corresponds to the determined document type to a second portion of the electronic image;
      identifying items extracted from the second portion of the electronic image via the optical character recognition algorithm,
      determining that at least one identified item matches at least one of the one or more original items, and marking each matching item; and
   rendering, by the one or more computing devices, an updated listing of items on the graphical user interface of the user computing device, the updated listing of items comprising a listing of each non-matching item and a marked listing of each matching item.

2. The computer-implemented method of claim 1, further comprising transmitting an instruction to an application on the user computing device to activate a camera on the user computing device.

3. The computer-implemented method of claim 1, further comprising capturing, by the user computing device, the electronic image of the document.

4. The computer-implemented method of claim 3, wherein capturing the electronic image comprises photographing the document, and wherein the electronic image of the document is analyzed by the one or more computing devices in response to photographing the document.

5. The computer-implemented method of claim 3, wherein capturing the electronic image comprises selecting an existing image from a file directory.

6. The computer-implemented method of claim 1, wherein receiving the electronic image of the document comprises receiving a selection of an existing image from a file directory.

7. The computer-implemented method of claim 1, wherein the first portion of the electronic image comprises a logo.

8. The computer-implemented method of claim 1, wherein the marking for each matching item comprises moving each matching item to a designated section on listing rendered on the graphical user interface.

9. The computer-implemented method of claim 1, wherein the marking for each matching item comprises crossing off the matching item or placing a graphical mark next to the matching item.

10. The computer-implemented method of claim 1, wherein the document associated with the transaction comprises a receipt of the transaction.

11. A system to render a display list on a graphical user interface, comprising:
   a storage device; and
   a processor communicatively coupled to the storage device, wherein the processor executes application code instructions that are stored in the storage device to cause the system to:
      receive a request to render a listing of items on a graphical user interface of a user computing device, the listing of items comprising one or more original items;
      receive a notification of selection of a user interface element on the user computing device requesting modification of the listing of items;
      activate an image capture device on the user computing device;
      receive an electronic image of a document from the image capture device;
      analyze the electronic image of the document by:
         determining a document type by performing image recognition on a first portion the electronic image, comparing information extrapolated via the image recognition to a database of document types, and identifying a match between the extrapolated information a document type;
         applying an optical character recognition algorithm that corresponds to the determined document type to a second portion of the electronic image;
         identifying items extracted from the second portion of the electronic image via the optical character recognition algorithm,
         determining that at least one identified item matches at least one of the one or more original items, and marking each matching item; and
      render, in response to receiving an electronic image of the document from the image capture device, an updated listing of items on the graphical user interface of the user computing device, the updated listing of items comprising a listing of each non-matching item and a marked listing of each matching item.

12. The system of claim 11, wherein activating the image capture device on the user computing device comprises activating a camera on the user computing device.

13. The system of claim 11, wherein the marking for each matching item comprises moving each matching item to a designated section on listing rendered on the graphical user interface.

14. The system of claim 11, wherein the marking for each matching item comprises crossing off the matching item or placing a graphical mark next to the matching item.

15. A computer program product, comprising:
a non-transitory computer-readable storage device having computer-readable program instructions embodied therein that when executed by a computer cause the computer to render a display list on a graphical user interface, the computer-readable program instructions comprising:
computer-readable program instructions to receive a request to render a listing of items on a graphical user interface of a user computing device, the listing of items comprising one or more original items;
computer-readable program instructions to receive a notification of selection of a user interface element on the user computing device requesting modification of the listing of items;
computer-readable program instructions to receive an electronic image of a document associated with a transaction;
computer-readable program instructions to analyze, after completing the transaction, the electronic image of the document by:
determining a document type by performing image recognition on a first portion the electronic image, comparing information extrapolated via the image recognition to a database of document types, and identifying a match between the extrapolated information and the document type;
applying an optical character recognition algorithm that corresponds to the determined document type to a second portion of the electronic image;
identifying items extracted from the second portion of the electronic image via the optical character recognition algorithm,
determining that at least one identified item matches at least one of the one or more original items, and
marking each matching item; and
computer-readable program instructions to render an updated listing of items on the graphical user interface of the user computing device, the updated listing of items comprising a listing of each non-matching item and a marked listing of each matching item.

16. The computer program product of claim 15, wherein the computer-readable instructions comprise computer-readable instructions to activate a camera on the user computing device.

17. The computer program product of claim 15, wherein receiving the electronic image of the document comprises receiving a selection of an existing image from a file directory.

18. The computer program product of claim 15, wherein the marking for each matching item comprises moving each matching item to a designated section on listing rendered on the graphical user interface.

19. The computer program product of claim 15, wherein the marking for each matching item comprises crossing off the matching item or placing a graphical mark next to the matching item.

20. The computer program product of claim 15, wherein the first portion of the electronic image comprises a logo.

* * * * *